(12) United States Patent
Vanka et al.

(10) Patent No.: US 11,460,936 B2
(45) Date of Patent: Oct. 4, 2022

(54) COMPUTING DEVICE

(71) Applicant: Lenovo (Singapore) Pte. Ltd., Singapore (SG)

(72) Inventors: Mounika Vanka, Durham, NC (US); Saba Shah, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/137,913

(22) Filed: Dec. 30, 2020

(65) Prior Publication Data
US 2022/0206592 A1    Jun. 30, 2022

(51) Int. Cl.
  *G06F 3/038*    (2013.01)
  *G06F 1/16*     (2006.01)
  *G06F 3/0354*   (2013.01)
(52) U.S. Cl.
  CPC .............. *G06F 3/038* (2013.01); *G06F 1/169* (2013.01); *G06F 3/03543* (2013.01)
(58) Field of Classification Search
  CPC ....... G06F 3/038; G06F 3/03543; G06F 1/169
  See application file for complete search history.

(56) References Cited

U.S. PATENT DOCUMENTS

| | | | | |
|---|---|---|---|---|
| 6,504,528 | B1* | 1/2003 | Kermani | G06F 3/016 345/163 |
| 7,009,597 | B1* | 3/2006 | Ames | G06F 3/03543 345/157 |
| 7,207,539 | B1* | 4/2007 | Jacobs | G06F 3/0395 248/118.1 |
| 2002/0140672 | A1* | 10/2002 | Hung | G06F 3/03543 345/157 |
| 2006/0066568 | A1* | 3/2006 | Cheah | G06F 1/3215 345/156 |
| 2011/0122064 | A1* | 5/2011 | Deng | G06F 3/03543 345/163 |
| 2013/0027334 | A1* | 1/2013 | Noma | G06F 3/0383 345/173 |
| 2014/0139455 | A1* | 5/2014 | Argiro | G06F 3/0346 345/173 |
| 2014/0144764 | A1* | 5/2014 | Wilson | H01H 9/161 200/5 R |
| 2015/0313821 | A1* | 11/2015 | Yuan | A61Q 15/00 424/67 |
| 2016/0326053 | A1* | 11/2016 | Kim | C04B 26/26 |
| 2020/0012357 | A1* | 1/2020 | Lien | G06F 3/0362 |

* cited by examiner

*Primary Examiner* — Ariel A Balaoing
(74) *Attorney, Agent, or Firm* — Brian J. Pangrle (57) ABSTRACT

A computing device can include a processor; memory accessible by the processor; a housing that includes a surface; and a deployable attachment mechanism for releasable attachment of an object to the surface.

15 Claims, 10 Drawing Sheets

Hooks/Loops 600

FIG. 6

High Friction Microfiber Array 700

FIG. 10 ns to com- 5 display 144 can be operatively coupled to one or more of the
COMPUTING DEVICE

TECHNICAL FIELD

Subject matter disclosed herein generally relates to computing devices.

BACKGROUND

A computing device can include a processor; memory accessible by the processor; and a housing.

SUMMARY

A computing device can include a processor; memory accessible by the processor; a housing that includes a surface; and a deployable attachment mechanism for releasable attachment of an object to the surface. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
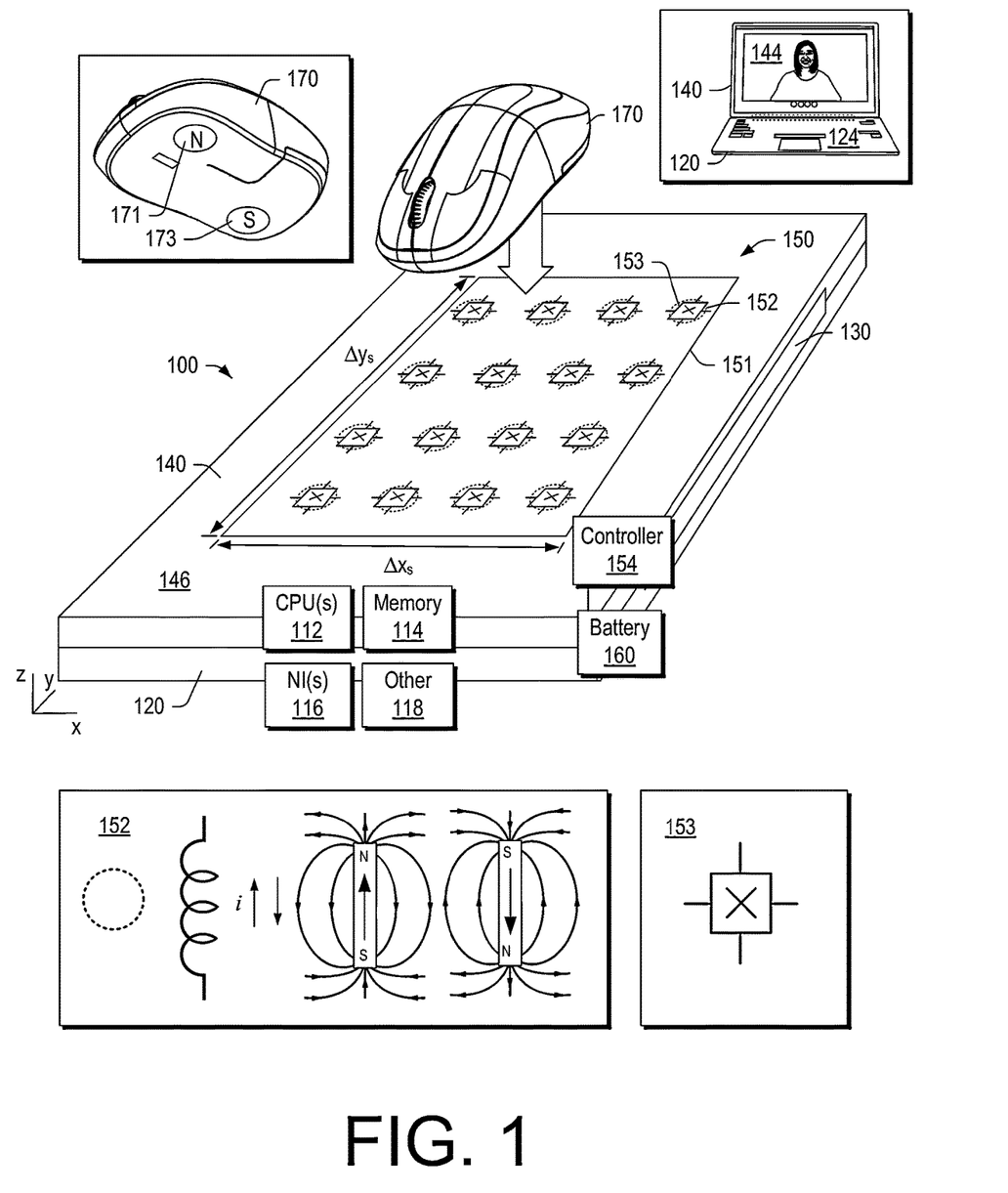
FIG. 1 is a perspective view of an example of a computing device and an example of a peripheral device.

FIG. 1 shows an example of a computing device 100 and an example of a peripheral device 170. As an example, the computing device 100 can include one or more processors 112, memory 114 (e.g., one or more memory devices), one or more network interfaces 116, and one or more other components 118. Such components may be, for example, housed in one or more of a first housing 120 and a second housing 140 where, the first housing 120 and the second housing 140 can be coupled via a hinge assembly.

As shown in FIG. 1, the first housing 120 can be a keyboard housing that includes a keyboard 124 and the second housing 140 can be a display housing that includes a display 144. In such an example, the keyboard 124 and the display 144 can be operatively coupled to one or more of the one or more processors 112 (e.g., for input, output, etc.). In the example of FIG. 1, the computing device 100 can be a clamshell type of device where the housings 120 and 140 can be oriented via the hinge assembly 130 to form an angle between the housings 120 and 140 of approximately 0 degrees to approximately 120 degrees of more. In such an example, approximately 0 degrees can be a closed clamshell orientation and approximately 120 degrees can be an open clamshell orientation where, for example, a user may touch-type on the keyboard 124 of the housing 120 while viewing information rendered to the display 144 of the housing 140.

FIG. 1 also shows a Cartesian coordinate system (x, y and z) that may be utilized to define one or more features of the computing device 100. For example, the housing 140 can include a surface 146 where the surface 146 can be a substantially planar surface defined via an x,y-plane.

In the example of FIG. 1, the computing device 100 also includes an attachment mechanism 150 that can include a surface 151, one or more electromagnets 152, one or more sensors 153, and a controller 154 that is operatively coupled to one or more batteries 160 (e.g., one or more rechargeable lithium-based batteries, etc.). As shown, the surface 151 can be within bounds of the surface 146 of the housing 140 where, for example, the surface 151 may be defined using one or more dimensions such as the dimensions $\Delta y_s$ and $\Delta x_s$.

As shown in FIG. 1, the peripheral device 170 may be moved such that it comes into contact with the surface 151 where the attachment mechanism 150 can be utilized to attach the peripheral device 170 to the computing device 100. For example, the computing device 100 can utilize at least one of the one or more electromagnets 152 to generate a magnetic field such that one or more magnets 171 and 173 of the peripheral device 170 can generate a magnetic attraction force with the magnetic field.

As shown in FIG. 1, the attachment mechanism 150 can include the one or more electromagnets 152 where polarity may be controlled. For example, consider utilizing the controller 154 to direct power of the battery 160 selectively to one or more of the one or more electromagnets 152, where such power may be directed using a current direction where the current direction determines electromagnet polarity (e.g., N-S or S-N), as illustrated using a bar magnet analogy with field lines.

As an example, a peripheral device can be a device that may be utilized with a computing device, directly and/or indirectly. As an example, a peripheral device can include circuitry or may be circuitry free. For example, the peripheral device 170 is shown to be a mouse that includes circuitry while a computing device stand may be a peripheral device that does not include circuitry (e.g., circuitry free). A peripheral device may include a wired and/or a wireless interface that can be operatively coupled to a wired and/or a wireless interface of a computing device. For example, the peripheral device 170 may be a wired mouse and/or a wireless mouse. A wired peripheral device may include a battery or batteries to power circuitry, may receive power via a wire, which may be a cable that can be operatively coupled to a port, a socket, etc., and/or may receive power in a wireless manner, for example, via one or more antennas.

As an example, a peripheral device may include one or more types of power generators such as, for example, solar cells, a magnet and coil assembly, etc. As to a magnet and coil assembly, consider a movable permanent magnet that can move back and forth through a coil of wire, where when the magnet moves from one end to the other, a magnetic field inside the coil reverses direction. In such an example, a voltage can be generated that is proportional to the change in the magnetic field direction, multiplied by the number of turns of wire (e.g., voltage generated=(number of wire turns)*(change in magnetic field strength per second)).

As shown in the example of FIG. 1, the peripheral device 170 can include the one or more magnets 171 and 173, which may be positioned with respect to one or more surfaces of the peripheral device 170. For example, the magnets 171 and 173 are positioned on a bottom surface of the peripheral device 170, which may be moved across a surface (e.g., a desktop, a tabletop, a mouse pad, etc.) to control a cursor rendered to a display of a display housing, etc. As explained, the magnets 171 and 173 may be utilized to attach the peripheral device 170 to the computing device 100. For example, the one or more of the magnets 171 and 173 can be utilized with the attachment mechanism 150 of the computing device 100 for releasable attachment of the peripheral device 170.

Magnets can exert forces and torques on each other due to the rules of electromagnetism. The forces of attraction of magnets are due to microscopic currents of electrically charged electrons orbiting nuclei and the intrinsic magnetism of fundamental particles (such as electrons) that make up the material. Such forces may be modeled as tiny loops of current called magnetic dipoles that produce their own magnetic field and are affected by external magnetic fields. For example, consider a magnetic dipole-dipole interaction. Where the magnetic dipoles that make up two magnets are known then the net force on the two magnets can be determined by summing up the interactions between the dipoles of the first magnet and the dipoles of the second magnet. In various examples, force between two magnets may be modeled as being due to forces between magnetic poles having magnetic charges smeared over them. For example, positive and negative magnetic charge can be connected by a string of magnetized material. Such a model can be adequate for predicting the forces between magnets. As an example, poles may be labeled north (N) and south (S) where attraction occurs between opposite poles of two magnets and where repulsion occurs between like poles of two magnets.

The magnetic attraction force between two nearby magnetized surfaces of area A may be estimated using the following equation:

$$F=\mu_0 H^2 A/2 = B^2 A/(2\mu_0)$$

where A is the area of each surface in m², H is their magnetizing field, in Nm, $\mu_0$ is the permeability of space ($4\pi \times 10^{-7}$ Tm/A), and B is the flux density in T.

In the foregoing equation, the force F is proportional to area A and flux density B squared. Thus, as area A and/or flux density B increase, the force F increases. For example, as to flux density B, a higher value in tesla will result in a greater force.

As an example, a magnet may be rated in mass or force. A pull force can be converted to a clamping pressure, for example, by calculating the magnet pole face cross-sectional area (e.g., overlap cross-sectional area) by dividing the force by area. A pull force is generally given as a pull of a magnet perpendicular to a ferromagnetic surface. However, depending on other force or forces, a magnet can slide along a surface with a shear force. A shear force can depend on friction. As an example, a magnet may start to slide over a ferromagnetic surface if the shear force applied is approximately 20 percent of the pull force. As an example, a material, a finish, etc., may be utilized for tailoring friction. For example, an elastomeric material may be utilized to increase friction such that the required shear force is more than the pull force. As an example, an elastomeric material may be a natural and/or synthetic rubber and/or one or more other polymeric materials that may be elastically deformable when subjected to a force such as a force due to magnetic attraction.

As an example, an electromagnet may be rated using one or more of force, wattage, drive voltage, current, etc. For example, consider an electromagnet rated at 25 N, 3 W, 12 VDC and 250 mA. Such an electromagnet may be able to attach a peripheral that has a mass of approximately 2.5 kg, where the acceleration of gravity is approximately 9.81 m/s². As to power, a battery may be rated in mAh such as, for example, 3000 mAh. For the foregoing electromagnet, such a battery may be able to supply power for a period of time of approximately 12 hours (e.g., 3000 mAh divided by 250 mA). As an example, an electromagnet may be provided as a unit with electrical contacts (e.g., wires, plugs, etc.). As an example, the foregoing example electromagnet may be a unit with a diameter of approximately 20 mm, a height of approximately 15 mm and a mass of approximately 30 g. An electromagnet may be of a different size, shape, rating(s), etc. For example, consider a mouse that can be of dimensions of approximately 12 mm by 8 mm by 5 mm with a mass of approximately 140 g (e.g., 0.14 kg) with a rechargeable lithium-ion battery. In such an example, force can be the product of 0.14 kg and 9.81 m/s², which is approximately 1.4 N. As another example, consider an electromagnet (e.g., solenoid electromagnet) rated at 5 N, 0.41 W, 5 VDC and 80 mA, with a mass of approximately 20 g. As yet another example, consider an electromagnet (e.g., solenoid electromagnet) with a minimum holding capacity rated at 1 N and a maximum holding capacity rated at 10 N with power of 0.85 W at 6 VDC with a diameter of approximately 15 mm and a height of approximately 5 mm. Such an electromagnet can include a case, a copper wire coil on a bobbin disposed in the case and a cover (e.g., an epoxy cover, etc.). As an example, a holding force rating may be for a zero air gap where a ferromagnetic object is in contact with the electromagnet. From the foregoing examples, power ratings are approximately 0.1 W per newton of holding capacity such that a 1 N holding capacity may demand a power of approximately 0.1 W.

As an example, an electromagnet may be of an adjustable holding force where a maximum holding force can be in excess of approximately 0.25 N such that it can attach a peripheral device with a mass 25 g. As an example, an attachment mechanism can include an array of electromagnets where multiple electromagnets of the array may be utilized collective to attach a peripheral device with a mass that may be in excess of 25 g. For example, consider a travel mouse that has a mass of approximately 50 g where two or more electromagnets of an attachment mechanism may be utilized to attach the travel mouse to a computing device.

As mentioned, the attachment mechanism 150 can include the one or more sensors 153. For example, consider the attachment mechanism 150 including one or more inductive sensors that can respond to a changing magnetic field that induces current in a coil of wire and produces voltage and/or one or more Hall effect sensors. A Hall effect sensor can include a conductor that carries a current where in the presence of a magnetic field, electrons in the conductor are deflected to produce a voltage gradient across a portion of the conductor (e.g., a portion perpendicular to the current direction). In such an example, a Hall effect sensor may detect presence of one or more of the magnets 171 and 173 and, for example, may detect orientation such as whether a south pole is approaching or whether a north pole is approaching. Such determinations may utilize voltage sign, current direction, etc. As explained, the controller 154 may be operatively coupled to the one or more sensors 153 where the controller 154 can adjust energy supplied to one or more of the one or more electromagnets 152.

As an example, an attachment mechanism can include one or more sensors that can detect whether or not a peripheral device is attached with a sufficient amount of holding force. In such an example, the attachment mechanism can adjust holding force using one or more electromagnets, for example, increasing current to an electromagnet, actuating another electromagnet, etc. As an example, an attachment mechanism can include one or more pressure sensors such as, for example, a piezo-electric sensor that can be disposed at least in part between a surface of a peripheral device and a surface of a computing device. In such an example, if a detected attraction force falls below a desired level, an attachment mechanism may adjust to increase the attraction force. As an example, where a computing device can identify and/or detect a mass of a peripheral device, an attachment mechanism may automatically call for energizing one or more electromagnets to generate a magnetic attraction force that is sufficient to attach the peripheral device to the computing device.

In the example of FIG. 1, the computing device 100 can include one or more attachment mechanisms, which may be arranged in separate areas, a common area, etc. As explained, an attachment mechanism can include a detector that can detect the presence of a peripheral device, which can include one or more magnets.

In the example of FIG. 1, the attachment mechanism 150 is shown as being an array of the electromagnets 152 and the sensors 153. In such an example, one or more of the electromagnetics 152 may be selectively energized to attach the peripheral device 170 responsive to detection of the presence of the peripheral device 170 by one or more of the sensors 153.

As an example, a peripheral device may be identifiable by a magnetic pattern. For example, consider the magnets 171 and 173, which may be spaced a distance apart and with a common polarity or opposing polarities. In such an example, the sensors 153 can detect the magnetic pattern, which may be compared to a data structure that includes data as to magnetic patterns and one or more associated peripheral devices (e.g., optionally with size, shape, mass, etc.). As an example, the controller 154 of the computing device 100 may issue a notification that indicates that a particular peripheral device is present, not present, has been one or more of detected, attached and removed, etc. For example, consider an audio notification that includes speech such as "do not forget your mouse" where a mouse is not attached or "mouse attached" where a mouse has been attached.

Figure 2:
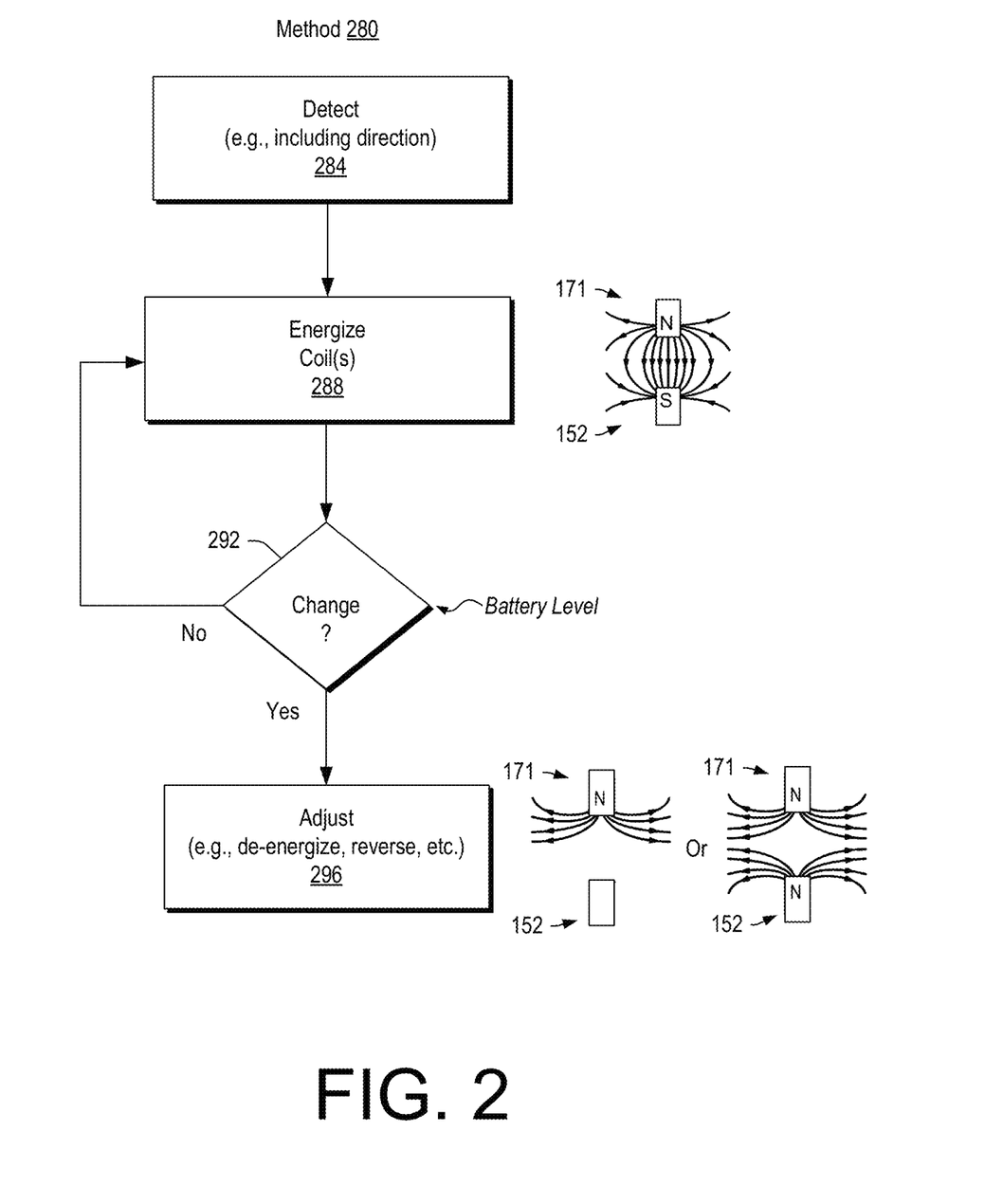
FIG. 2 is a block diagram of an example of a method.

FIG. 2 shows an example of a method 280 that may be implemented using a computing device such as the computing device 100. As shown, the method 280 can include a detection block 284 for detecting a magnetic field, optionally including direction, an energize block 288 for energizing one or more coils (e.g., one or more electromagnet coils), a decision block 292 for detecting a change in one or more conditions, and an adjust block 296 for adjusting the energizing of the one or more coils. For example, consider adjusting to de-energize one or more of the coils, adjusting to change magnetic field strength of one or more of the coils and/or adjusting to reverse current supplied to one or more of the coils. As to reversing current, consider as an example, generating a repulsion force that may cause a magnet to be repelled from the attachment mechanism 150. In such an example, a peripheral device may "pop-off" a surface (e.g., move to indicate that it has been released, etc.).

In the example of FIG. 2, the method 280 may include determining an orientation status of a computing device such as the computing device 100. For example, the method 280 can include a decision block that decides if the computing device 100 is in a closed clamshell orientation or not. As an example, a method can include energizing one or more electromagnets and/or sensors responsive to deciding that a clamshell computing device has been transitioned from an open orientation to a closed orientation. For example, consider use of one or more types of sensors such as a proximity sensor (e.g., a Hall effect sensor, etc.), an ambient light sensor, a hinge position sensor, etc. As an example, a computing device may determine that a peripheral device has not been attached within a period of time following transition to a closed clamshell orientation and, in response, de-energize one or more electromagnets, sensors, etc.; whereas, if it determines that one or more peripheral devices have been attached, the computing device may continue to energize one or more electromagnets that generate attractive force to attach the one or more peripheral devices to the computing device.

As an example, where one or more electromagnets are powered by a battery of a computing device, a battery power level may be a condition that can be taken into account, for example, such that the battery is not detrimentally drained. Where battery level is a concern, as an example, a computing device may issue one or more notifications as to the level of a battery or levels of batteries. As an example, the decision block 292 of the method 280 may consider a change in battery level to be a trigger for an adjustment via the adjustment block 296. As explained, a computing device may issue a visual notification and/or an audible notification if one or more electromagnets are to be de-energized, which could risk detachment of one or more peripheral devices from the computing device. In such an example, a user may address the condition to reduce risk of damage to a peripheral device (e.g., damage due to detachment, etc.).

Figure 3:
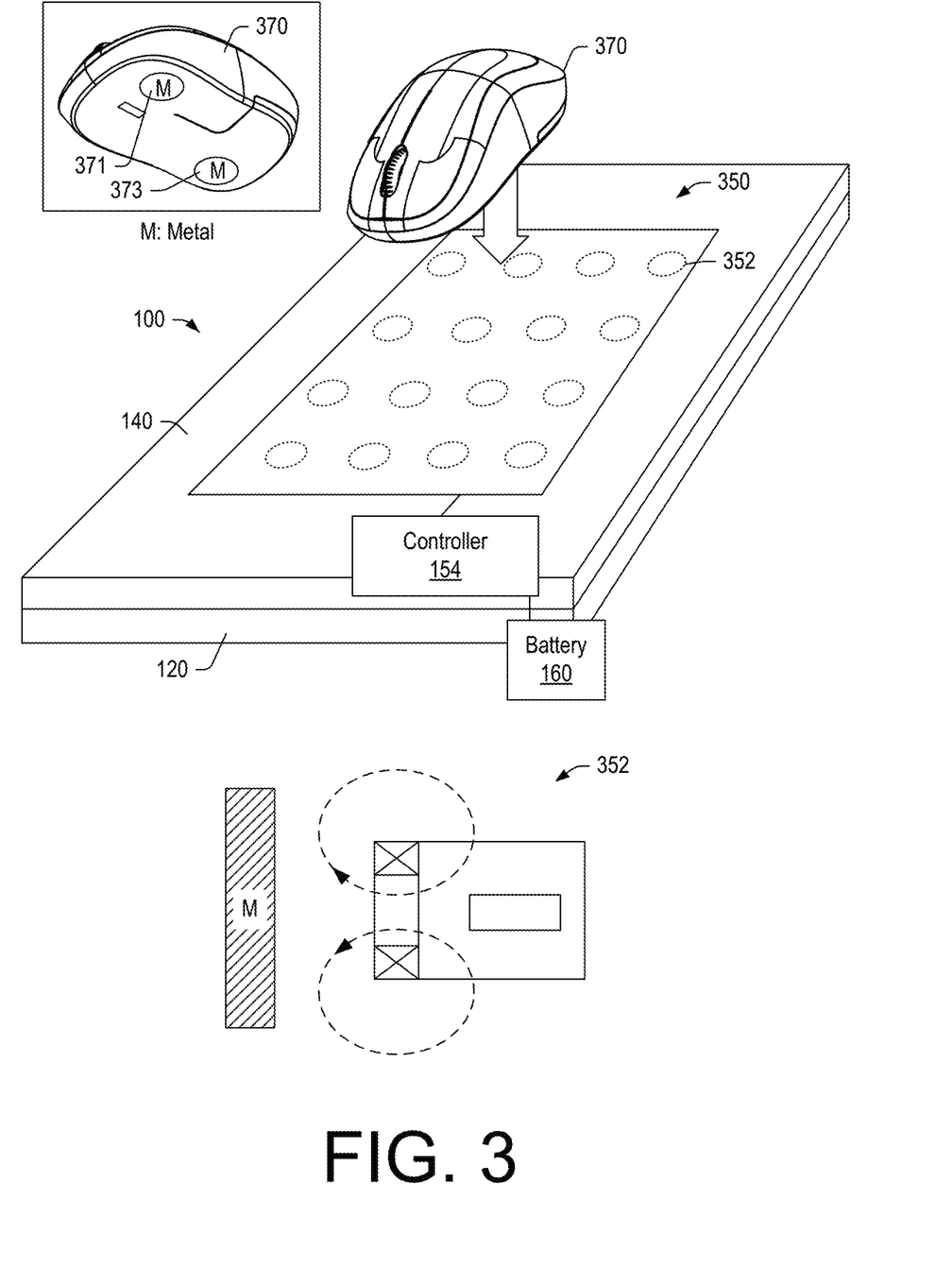
FIG. 3 is a perspective view of an example of a computing device and an example of a peripheral device.

FIG. 3 shows an example of the computing device 100 with an example of an attachment mechanism 350 and an example of a peripheral device 370. In the example of FIG. 3, the attachment mechanism includes one or more metal detectors 352 and the peripheral device 370 includes one or more pieces of metal 371 and 373. In the example of FIG. 3, the one or more metal detectors 352 can each include an electromagnet where presence of metal (M) in a magnetic field generated by the electromagnet can be detected. In such an example, the controller 154 can provide for adjusting power to the electromagnet, for example, to increase power to increase attraction where the metal is a ferromagnetic metal.

Iron, cobalt and nickel, as well as alloys composed of one or more of such ferromagnetic metals tend to be strongly attracted to magnets. Other ferromagnetic metals include gadolinium, neodymium and samarium. Paramagnetic metals tend to be weakly attracted to magnets, and include platinum, tungsten, aluminum and magnesium. Ferrimagnetic metals like magnetite are also attracted to magnets, while diamagnetic metals like silver and copper tend to be repelled by magnets.

As an example, the metal detector 352 can be an inductive proximity sensor. For example, consider a sensor with a high-frequency magnetic field generated by coil in an oscillation circuit. In such an example, when a metal approaches the magnetic field, an induction current (eddy current) flows in the metal due to electromagnetic induction. As the metal approaches the sensor, the induction current flow increases, which causes the load on the oscillation circuit to increase. A sensor can detect this change in the oscillation status, for example, with an amplitude detecting circuit that can output a detection signal.

As explained, a coil may be utilized for detection (e.g., proximity detection) and for generating a magnetic attractive force. For example, consider a coil that can operate using an oscillating current (e.g., an alternating current) and using a non-oscillating current (e.g., a direct current). In such an example, the oscillating current may be utilized for detection while the non-oscillating current may be utilized for generating a magnetic field for attachment, etc.

Figure 4:
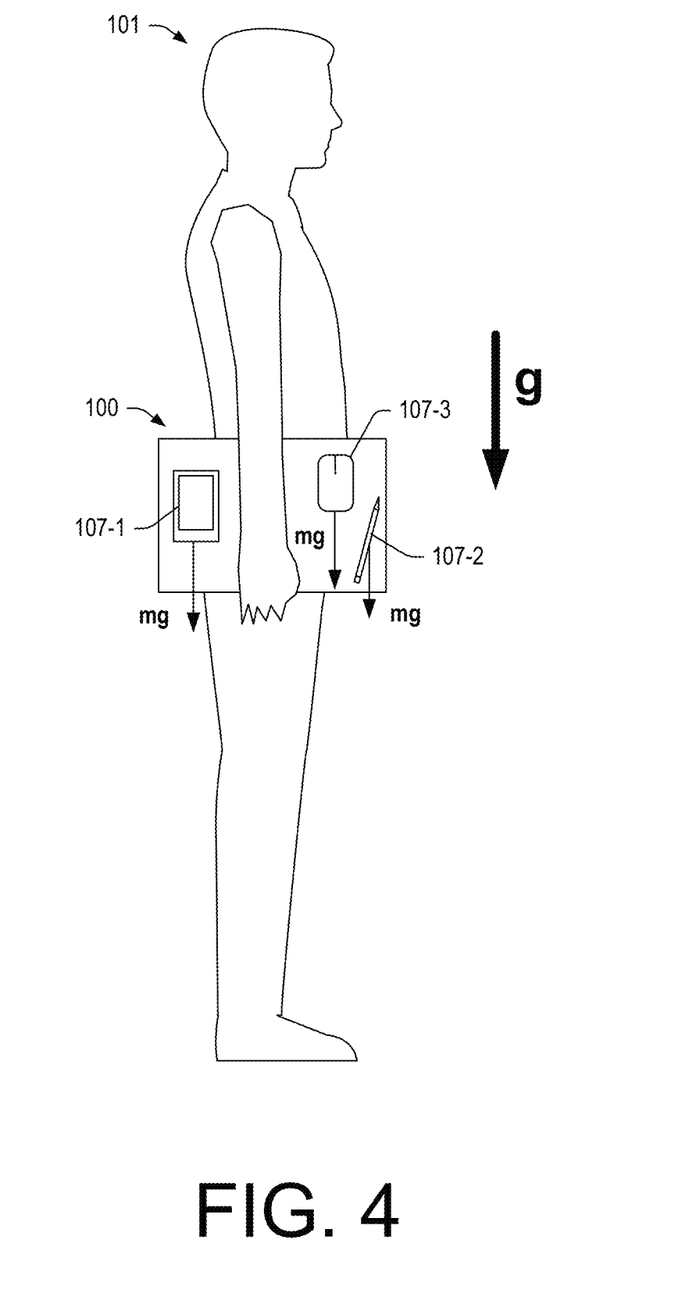
FIG. 4 is a side view of an example of a person carrying an example of a computing device with some examples of peripheral devices.

FIG. 4 shows an example of the computing device 100 being carried by a person 101 where one or more peripheral devices 107-1, 107-2 and 107-3 are attached to the computing device 100. As shown, each of the peripheral devices 107-1, 107-2 and 107-3 can exert a force that depends on gravity. In the example, of FIG. 4, the force may be considered a shear force with respect to the computing device 100 as the surface of the computing device 100 to which the peripheral devices 107-1, 107-2 and 107-3 are attached is substantially normal to the surface of the Earth, which makes it substantially aligned with respect to the direction of the acceleration of gravity. In the example of FIG. 4, the peripheral device 107-1 is shown as a smartphone, the peripheral device 107-2 is shown as a stylus and the peripheral device 107-3 is shown as a mouse.

As mentioned, a shear force can result in sliding where sliding may be determined in part with respect to friction. As an example, an object subjected to a magnetic holding force may start to slide if the shear force applied is approximately 20 percent of the magnetic holding force. As explained, friction may be increased to a level where shear force for sliding can be greater than the magnetic holding force.

As an example, the person 101 may walk, run or otherwise move. For example, consider locomotion where rapid deceleration of the body at foot contact results in an impact-related shock wave, which travels up from the ground through the body until it reaches the head. In such locomotion, a ground reaction force (GRF) exists due to impact where GRF peaks can be substantial, with magnitudes between 0.6 to 1.0 times body weight (BW) during walking and between 1.0 to 3.0 times BW during running. As such, locomotion of the person 101 can result in shock forces being experienced by the computing device 100 and the peripheral devices 107-1, 107-2 and 107-3. In such an example, the mass of a peripheral device may result in a greater shock related shear force.

As an example, the computing device 100 can include one or more sensors that can detect movement such as movement of the person 101 while carrying the computing device 100 and/or that can detect variations in attachment conditions responsive to movement of the person 101. In such examples, an attachment mechanism may adjust one or more electromagnets to account for movements that may result in shear force(s) that may act detrimentally to cause detachment of one or more peripheral devices.

Figure 5:
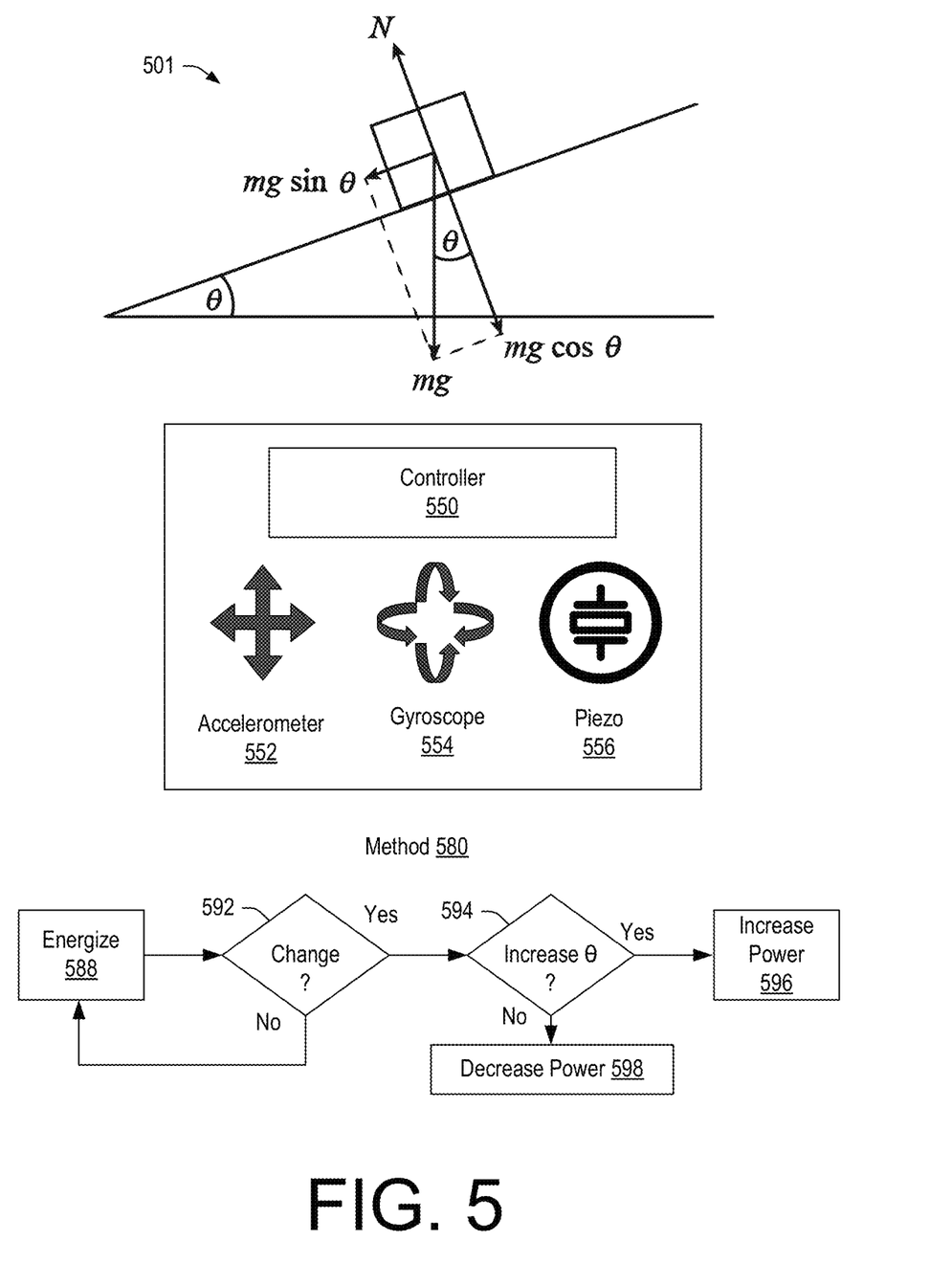
FIG. 5 is an example of a force diagram, diagrams examples of sensors and a block diagram of an example of a method.

FIG. 5 shows an example of a force diagram 501, an example of a controller 550 and sensors 552 and 554 and an example of a method 580. As shown, an angle θ between horizontal and a surface can be utilized to determine force due to the acceleration of gravity of an object on the surface. Where the angle θ approaches 90 degrees, the acceleration of gravity can act at a maximum on the object to exert a shear force where, as explained, without sufficient holding force and/or friction, the object may slide on the surface. In various instances, the surface may be at an angle that exceeds 90 degrees, for example, consider 180 degrees where shear force may be zero yet friction may play little to no role in maintaining an object attached. In various instances, an attachment mechanism may provide for maintaining attachment of a peripheral device to a computing device over a range of angles with respect to gravity.

As shown in FIG. 5, a computing device can include a controller 550 that can be operatively coupled to one or more sensors, which can include, for example, one or more of an accelerometer 552, a gyroscope 554, a piezo-electric sensor 556, etc.

As shown in FIG. 5, the method 580 can include an energize block 588 for energizing one or more electromagnets, a decision block 592 for deciding if a change has occurred or is occurring, a decision block 594 for deciding if an increase in the angle θ has occurred or is occurring, an increase block 596 for increasing power (e.g., increasing energy) and a decrease block 598 for decreasing power (e.g., decreasing energy). In such an example, power (e.g., energy) can be tailored to a scenario, which may help to maintain attachment of a peripheral device to a computing device and/or conserve available power (e.g., battery power, etc.). As indicated, if the decision block 592 decides "no", the method 580 can continue at the energize block 588; whereas, if the decision block 592 decides "yes", the method 580 can continue to the decision block 594. As indicated, if the decision block 594 decides "no", the method 580 can continue at the decrease block 598; whereas, if the decision block 594 decides "yes", the method 580 can continue to the increase block 596.

As explained, one or more materials may be utilized to increase friction. As an example, one or more materials can include hooks and loops to form a hook and loop fastener (e.g., VELCRO, etc.). For example, one material can include hooks and another material can include loops where, when the two are pressed together, the hooks catch in the loops and the two materials fasten or bind (e.g., releasably).

Figure 6:
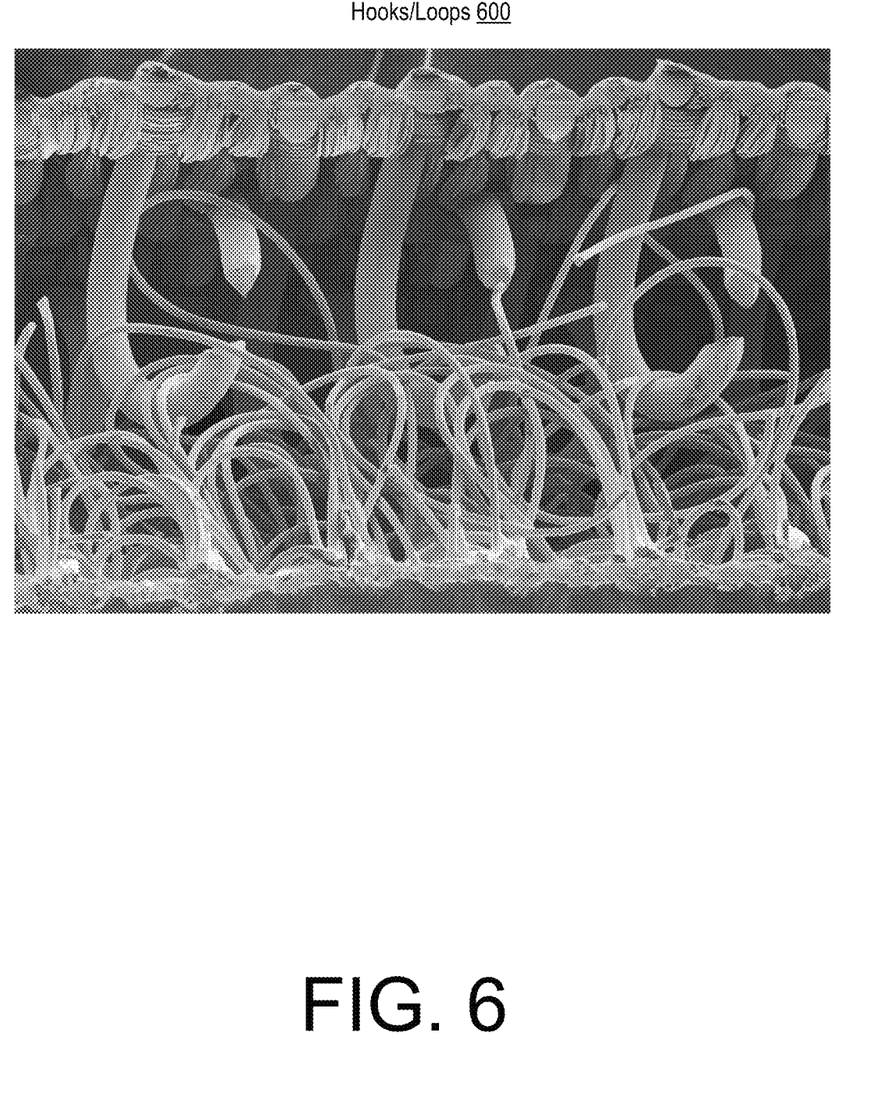
FIG. 6 is an example of a micrograph of a hook and loop fastener.

FIG. 6 shows a micrograph 600 of an example of a hook and loop fastener where hooks are provided on an upper layer of material and loops are provided on a lower layer of material.

As an example, a hook and loop fastener may be utilized as an alternative and/or as a supplement to one or more electromagnets. For example, an attachment mechanism can include one or more hook materials and/or loop materials where a peripheral device can include a corresponding material (e.g., loop material and/or hook material, respectively).

As an example, loop material, hook material or loop and hook material may be made of one or more natural and/or synthetic materials. As an example, consider molded plastic hooks made from one or more polymeric resins (e.g., aliphatic polyamides, semi-aromatic polyamides, polyester, polyethylene, polypropylene, etc.).

As an example, a peripheral device can include one or more of hook and loops and a surface of a computing device can include one or more of loops and hooks such that the peripheral device can be attached to the surface of the computing device.

As an example, one or more other types of contact fasteners may be utilized, which may be considered to be fiber type of contact fasteners. For example, consider the ALFA-LOK fastener, which includes fibers with quadrilobal mushroom shapes that can be engaged at by pressing the objects together. In such an example, layers may include the same types of structures (e.g., quadrilobal mushroom shapes, etc.).

Figure 7:
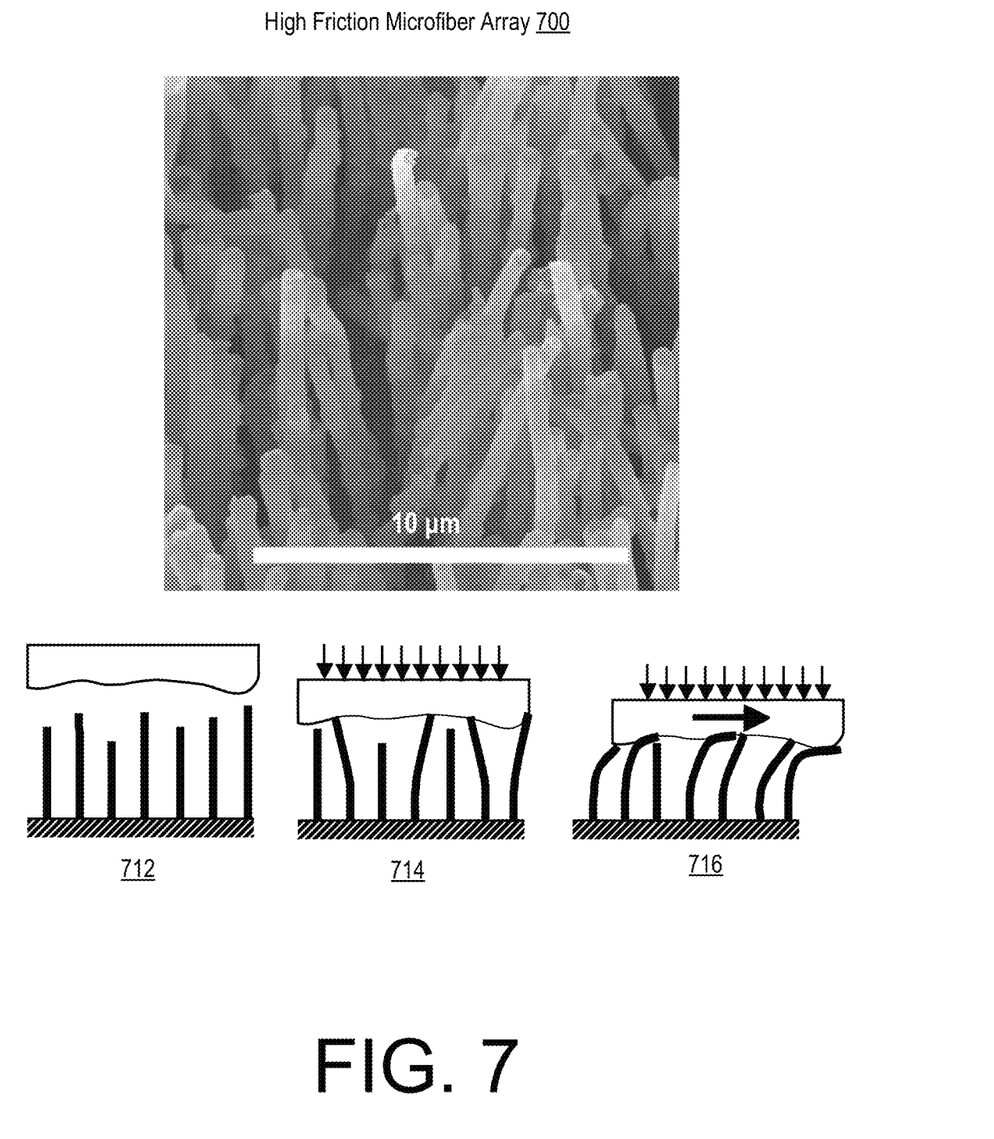
FIG. 7 is an example of a micrograph of a microfiber array and example diagrams of operation of the microfiber array.

FIG. 7 shows a micrograph of an example of a material 700 that can increase friction. In particular, the material 700 is shown as a high friction microfiber array. As an example, a high friction microfiber array may be utilized as a supplement to one or more electromagnets. As explained, such a material can help to increase friction such that the amount of shear force for detachment or sliding of a peripheral device on a computing device increases. In such an example, a person may carry the computing device with added confidence that as the angle θ approaches 90 degrees, one or more peripheral devices do not detach or slide.

As shown in a series of graphics 712, 714 and 716 in FIG. 7, where an amount of force is applied by an object to the microfiber array, various microfibers can "point" in different directions in a manner that can resist sliding of the object. For example, the graphic 712 can represent two objects approaching each other, the graphic 714 can represent force between the two objects such that the microfiber array deforms, and the graphic 716 can represent overcoming resistance to sliding when a force parallel to the lower surface is applied. In such an example, a magnetic attraction force may be utilized to draw two surfaces together to thereby elastically deform a microfiber array where such elastic deformation acts to increase an amount of friction between the two surfaces. In such an example, sliding can be resisted by a magnetic attraction force and by a friction force (e.g., static friction) that is required to be overcome through application of a shear force. In the example of FIG. 7, where a magnetic holding force is greater than the force that would be applied by gravity to a peripheral device on a surface of a computing device, the peripheral device will not fall off the computing device if an angle of 180 degrees as per the angle θ in FIG. 5 exists (e.g., an upside down orientation). Further, in transitioning to and/or from such an upside down orientation, a microfiber array can resist sliding via the magnetic holding force causes some deformation of the microfiber array that increases friction between the microfiber array and a surface of the peripheral device. As an example, with respect to the approximately 90 degree angle θ example of FIG. 4, an attachment mechanism that includes a microfiber array in additional to one or more magnets can improve stability of one or more of the peripheral devices 107-1, 107-2 and 107-3 by resisting shear force(s), which may include impact forces generated while an individual is walking, running, etc.

As an example, the material 700 can be a high-friction, low-adhesion material. As an example, the material 700 may be made using a stiff polymer that is in the form of a microfiber array to increase friction. For example, a microfiber array form of a stiff polymer can exhibit a higher coefficient of friction than a smooth sheet form of such a stiff polymer. In general, rubber on glass can provide friction coefficients that may be an order of magnitude or more greater than a stiff polymer in sheet form where the elastic modulus (e.g., E or Young's modulus) of a rubber may be approximately 0.01 to approximately 0.1 GPa and the elastic modulus of a stiff polymer may be approximately 1 GPa or more (e.g., the elastic modulus of polypropylene may be approximately 1.5 GPa or more). When a stiff material in formed into an ordered fiber array, it can have an effectively high compliance, permitting high contact area on rough surfaces. As an example, by appropriate choice of fiber array geometry, frictional and adhesion properties can be tailored.

The elastic modulus (E) of a material may be estimated using a stress-strain curve where stress is the force causing deformation divided by the area to which the force is applied and strain is the ratio of the change in a dimension caused by the deformation to the original value of the dimension. As strain is a dimensionless quantity, the units of E have units of force per unit area (e.g., pressure, etc.).

As to the micrograph of FIG. 7, it is a scanning electron micrograph of an array of 20 μm long, 0.6 μm diameter polypropylene fibers etched from a polycarbonate membrane where the scale bar represents 10 μm.

As an example, relatively high friction can be achieved using arrays of 0.3 μm radius polypropylene fibers over pressures of 0.17 to 0.79 N/cm$^2$ (e.g., approximately 1.1 psi) where, under 0.79 N/cm$^2$ normal stress, the 0.3 μm radius polypropylene fiber arrays had an average friction coefficient of approximately 5.3 whereas a friction coefficient for polypropylene on smooth glass was approximately 0.3. The friction coefficient or coefficient of friction (CoF) describes the ratio of the force of friction between two bodies and the force "pressing" them together. For example, a magnetic attraction force can be considered a force that "presses" two objects together.

For surfaces at rest relative to each other $\rho_s$ can be the coefficient of static friction, which is usually larger than its kinetic counterpart. The coefficient of static friction exhibited by a pair of contacting surfaces depends upon the combined effects of each surface such as, for example, deformation characteristics and surface roughness.

The frictional behavior approaches of the microfiber array approaches that of rubber, which, under the same pressure, is expected to have a friction coefficient of approximately 32. The frictional behavior may be achieved by molding polypropylene into an array of microfibers, resulting in a compliant structure that allows for substantial interfacial contact even under light pressure. Friction enhancement through increased compliance is consistent with an adhesion theory of friction. A quantitative prediction for the enhanced coefficient of friction may be obtained by treating fibers as ideal elastic columns subject to Coulomb's friction law (see, e.g., Majidi et al., High Friction from a Stiff Polymer Using Microfiber Arrays, Physical Review Letters, 97, 076103-1 to 076103-4 (2006), which is incorporated by reference herein).

As an example, a material or materials may be utilized to increase friction. For example, high dry friction can be via contact between two surfaces, which may utilize one or more types of materials. As an example, consider a soft material with an elastic modulus less than approximately 10 MPa. As explained, a "stiffer" material may be utilized via a microfiber approach. As explained, a stiff thermoplastic microfiber array may be utilized to increase friction (e.g., polypropylene having an elastic modulus of approximately 1 GPa). In such an example, the thermoplastic material may provide acceptable feel to human touch and wearability (durability) while being able to supplement a magnetic attraction force, for example, to reduce risk of detachment or sliding of a peripheral device on a computing device.

As an example, a surface can be an artificial gecko toe surface that includes polymeric pillar structures. Such artificial gecko toe structures may have shape that play a lesser role on adhesion force when compared to size and density of the structures, particularly when the lateral dimensions falls below 100 nm. However, as to gecko toe seta, they can be more than simple cantilevers and a spatula, on the end of a seta, can be more than simple pillars or fibers. The release of a single seta has been found to occur at a characteristic angle of approximately 30 degrees such that geometry plays a substantial role in the detachment of a seta (see, e.g., Tian et al., Adhesion and friction in gecko toe attachment and detachment, PNAS, 103(51), pp. 19320-19325, 19 Dec. 2006, which is incorporated by reference herein).

Figure 8:
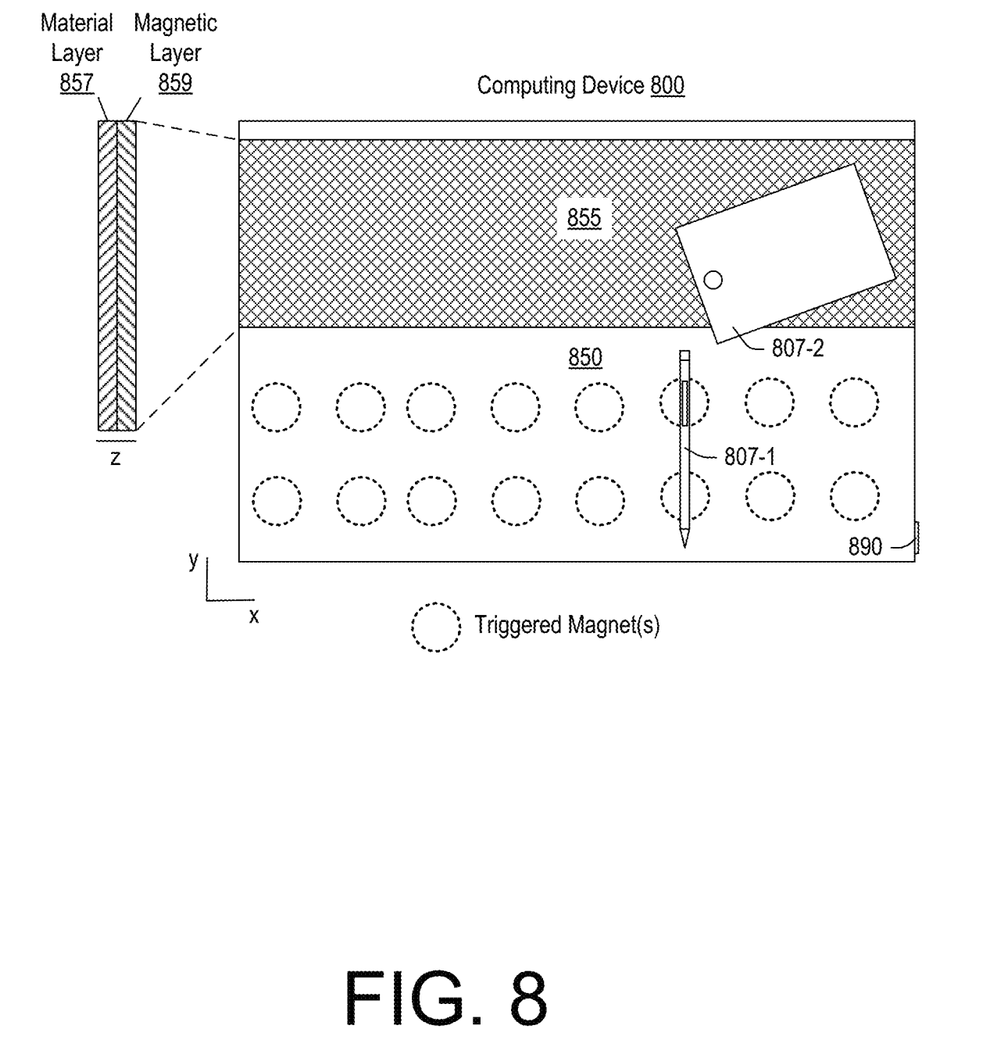
FIG. 8 is a diagram of an example of a computing device and examples of attachment mechanism.

FIG. 8 shows an example of a computing device 800 that includes one or more of an array of triggered electromagnets 850 as a first attachment mechanism and another attachment mechanism 855 along with some examples of peripheral devices 807-1 and 807-2, which may be attached to the computing device 800. As shown, the attachment mechanism 855 can include a material layer 857 and a magnetic layer 859. In such an example, the computing device 800 can include one or more ferromagnetic materials such that the attachment mechanism 855 can be removably attached. For example, consider a user that desires to have a hook and loop fastener based attachment mechanism on the computing device 800 or, for example, a microfiber array and magnetic attachment mechanism on the computing device 800. In such an example, the material layer 857 can include one or more of hooks, loops and microfiber arrays. In such an example, the magnetic layer 859 may be of a strength that is sufficient to attach it to the computing device 800 and to attach one or more peripheral devices to the attachment mechanism 855. As an example, the attachment mechanism 855 can be a sheet, which may be stiff or flexible, that can be attached to the computing device 800 to cover at least a portion of a surface of the computing device 800. In the example of FIG. 8, where both attachment mechanisms 850 and 855 are included, if power utilization is an issue, the attachment mechanism 855 may be utilized as a non-powered attachment mechanism. For example, the attachment mechanism 855 may be utilized without electrical power, particularly, for example, without electrical power supplied by one or more batteries of the computing device 800. As an example, the computing device 800, if including the attachment mechanism 850, may issue a notification to a user such as, for example, "power is low, please use the non-powered attachment mechanism". In such an example, a user may reposition one or more peripheral devices from the attachment mechanism 850 to the attachment mechanism 855, which may include have the user attach the attachment mechanism 855 to the computing device 800, if desired.

In the example of FIG. 8, the peripheral device 807-1 can be a stylus and the peripheral device 807-2 can be a smartphone. In such an example, the position of the peripheral device 807-2 may be without particular precision where an amount of overlap is sufficient to attach the peripheral device 807-2. As an example, a user may utilize the computing device 800 where the peripheral device 807-2 may be utilized as a hot spot such that a network connection is available for the computing device 800 (e.g., consider cellular network communication circuitry of the peripheral device 807-2 being utilized to generate a WiFi hot spot accessible via WiFi (e.g., IEEE 802.11), BLUETOOTH (e.g., IEEE 802.15.1, etc.), etc. As to the peripheral device 807-1, it may snap into an orientation such as the orientation shown. For example, consider portions over a length of the peripheral device 807-1 being ferromagnetic such that electromagnets can generate fields that attract such portions. In such an example, as the mass of the peripheral device 807-1 may be less than approximately 50 g, it may readily align with the generated fields (e.g., consider a lowest potential energy type of alignment).

As an example, the computing device 800 can include a switch 890, which may be utilized to terminate supply of energy to one or more electromagnets, which may make it easier for a user to pick up a peripheral device such as, for example, the peripheral device 807-1. In such an example, the switch may be a physical switch such as a push button, a slider, etc.

As an example, the attachment mechanism 855 may be utilized for attachment of one or more types of peripheral devices where, if hooks or loops are included on the material layer 857, a peripheral device may include loops or hooks that can contact fasten to the material layer 857. As an example, the peripheral device 807-2, as a smartphone, may have a mass that may be greater than approximately 80 g and less than approximately 400 g.

Figure 9:
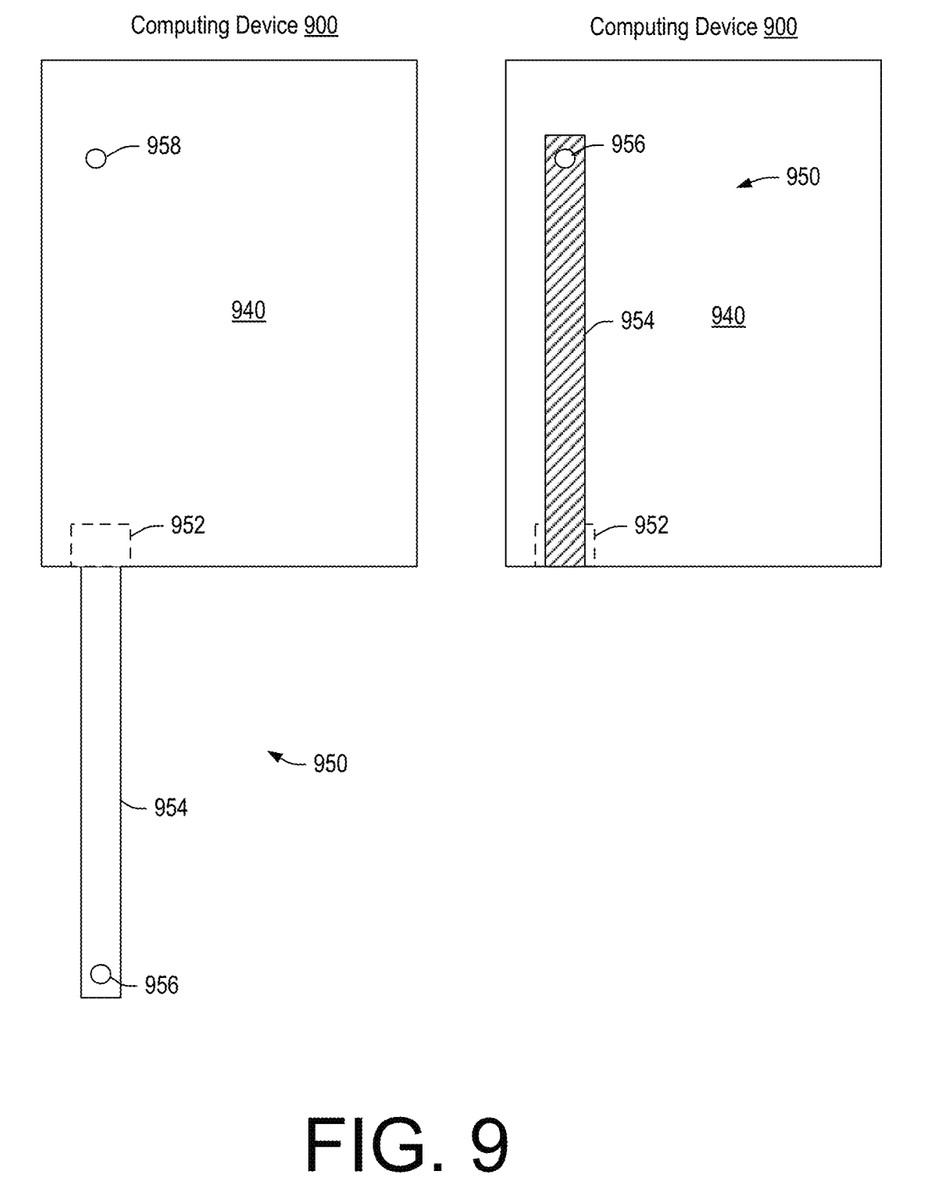
FIG. 9 is a diagram of an example of a computing device and an example of an attachment mechanism.

FIG. 9 shows an example of a computing device 900 with an attachment mechanism 950 that includes a chamber 952, a strip 954, a coupling 956 and another coupling 958. In the example of FIG. 9, the strip 954 can be stored in the chamber 952, for example, on a reel that provides for deployment of the strip 954. As shown, the strip 954 can be deployed by pulling it out of the chamber 952 and then folding it over onto a surface 946 of the computing device 900. As to the couplings 956 and 958, they can be mechanical couplings, magnetic couplings (e.g., magnets, a magnet and ferromagnetic material, etc.), hook and loop fastener couplings, etc. In the example, of FIG. 9, the strip 954 can be a hook and loop fastener strip that can provide for attachment of one or more peripheral devices to the computing device 900. As an example, the strip 954 may be an attachment mechanism such as the attachment mechanism 855 of FIG. 8, which can be magnetic. In such an example, the strip 954 may be attachable to the surface 940 of the computing device 900 with or without the couplings 956 and 958.

In various examples, an adhesive may be utilized to secure a material to a surface of a computing device or to secure a material to a peripheral such that the peripheral can be attached to a computing device using at least one attachment mechanism of the computing device. As an example, an adhesive may be a chemical adhesive such as adhesive of a tape.

As an example, a computing device can include one or more attachment mechanisms that can provide for attachment of one or more types of peripherals (e.g., headphones, wireless earphones, a smartphone, a mouse, a stylus, etc.), which may facilitate transport thereof, for example, from an office to a meeting room, etc.

As an example, a lid of a laptop, which can be a display housing, can include one or more magnetic features. In such an example, the laptop can include circuitry such that the magnetism is available when the lid is closed, which may be triggered by a user or automatically upon closing of a lid. In such an example, a surface can be magnetic for a period of time, which may be a few minutes and optionally configurable (e.g., using a graphical user interface, etc.). As an example, where nothing is attached within a given time span, energy supply to one or more magnets may be shutoff.

As an example, a kit may include one or more features that can be mounted, attached, etc., to one or more peripherals, etc. For example, consider an adhesive strip that includes adhesive on one side and fibers on another side. Or, for example, consider a strip with adhesive on one side and a magnetic or ferromagnetic material on the other side. In such examples, the kit may include one or more features that can be attached to a surface of a computing device. For example, consider a corresponding strip (e.g., or other shaped features) that can provide for attachment.

As explained, a computing device can include a processor; memory accessible by the processor; a housing that includes a surface; and a deployable attachment mechanism for releasable attachment of an object to the surface.

As an example, a computing device can include a processor; memory accessible by the processor; a housing that includes a surface; and a deployable attachment mechanism for releasable attachment of an object to the surface. In such an example, the attachment mechanism can include an electromagnet or electromagnets and/or fibers. As to fibers, consider one or more of contact fastener fibers and shear resistance fibers. The hook and loop contact fastener VELCRO is an example of a contact fastener that include contact fastener fibers. As to shear resistance fibers, such fibers provide a desirable coefficient of friction such that an object is less likely to slide on a surface. As an example, shear resistance fibers may be provided as a fiber array. As an example, a fiber array may be a polymeric fiber array. As an example, an attachment mechanism can include an electromagnet and fibers. For example, consider an electromagnet that can emit at least a magnetic field over an area where at least a portion of the area is covered with fibers such as, for example, shear resistance fibers. In such an example, a magnetic attraction force may help to attach an object where such force can activate shear resistance fibers (e.g., via desired deformation of various shear resistance fibers, which may be in a fiber array). In such an example, the magnetic attraction force and the shear resistance fibers can help to maintain an object attached to a surface of a computing device.

As an example, a computing device can include a Hall effect sensor operatively coupled to a deployable attachment mechanism. In such an example, a signal generated by the Hall effect sensor can control delivery of energy to an electromagnet of the deployable attachment mechanism. In such an example, the delivery of energy to the electromagnet can include a particular current flow direction that can depend on the signal. For example, if the Hall effect sensor generates a signal in response to a south pole (S), then current may generate an electromagnet orientation such that a north pole (N) of a magnet field of the electromagnet is exposed at a surface (e.g., emanates at the surface) to attract the south pole (S), which can be of a magnet of an object such as, for example, a peripheral device.

As an example, a computing device can include a metal detector operatively coupled to a deployable attachment mechanism. In such an example, a signal generated by the metal detector can control delivery of energy to an electromagnet of the deployable attachment mechanism. For example, where the metal detector can detect a ferromagnetic material, an energized electromagnet can generate a magnetic field that can attract the ferromagnetic material, which can be ferromagnetic material of an object such as, for example, a peripheral device. As an example, a metal detector can include an electromagnet that may be utilized for one or more purposes. For example, consider utilization of the electromagnet for metal detection of a ferromagnetic material and utilization of the electromagnet for generation of a magnetic field that can attract the ferromagnetic material.

As an example, a deployable attachment mechanism can include an array of electromagnets where, for example, a sensor array may be operatively coupled to the array of electromagnets. As an example, a sensor array can include at least one of a Hall effect sensor and a metal detector.

As an example, a computing device can include a gravitational direction sensor operatively coupled to a deployable attachment mechanism. For example, consider an accelerometer, a gyroscope, etc., that can detect a direction of gravity. As an example, a signal generated by a gravitational direction sensor can control energy supplied to at least one electromagnet of a deployable attachment mechanism. In such an example, energy can be increased to strengthen a magnetic field to increase a magnetic attraction force that can be utilized to attach an object to a computing device. For example, where such an object is a mouse (e.g., a HID), if the gravitational direction sensor detects tilting that would increase risk of the mouse sliding on a surface of a housing of the computing device, the deployable attachment mechanism can increase energy supplied to an electromagnet to reduce the risk of the mouse sliding on the surface.

As an example, a computing device can include a housing that includes a bay where a deployable attachment mechanism is storable in the bay. For example, consider a strip of material that can be storable in the bay via a reel, etc. In such an example, the strip of material may be deployable by unreeling the strip of material from the reel in the bay. In such an example, the strip of material can include fibers, magnets, etc. For example, consider a strip of material that includes one or more permanent magnets and/or one or more electromagnets. As an example, a strip of material can include a portion of an attachment mechanism and a surface of a housing can include another portion of an attachment mechanism. In such an example, consider portions that are loops and hooks, magnets and ferromagnetic material, magnets and magnets, etc. As an example, a strip of material may include opposing sides (e.g., opposing faces) that are the same (e.g., homogeneous) or that differ (e.g., heterogeneous). For example, one face may be magnetic and another opposing face may include fibers. As an example, a strip of material can include multiple different materials on one or more of opposing sides (e.g., magnetic and fiber, magnetic and magnetic, fiber and fiber, etc.).

As an example, a computing device can include a deployable attachment mechanism that includes a multilayer component that includes a magnetic layer and a fiber layer. In such an example, the layers may be stacked, offset, etc. In such an example, a fiber layer can include at least one of a contact fastener layer and a shear resistance layer.

As an example, a computing device can include a housing that is a display housing. In such an example, the computing device can include a second housing, which may be another display housing or, for example, a keyboard housing. As to two display housings, such a computing device may include a continuous display that extends across at least a portion of each of the two display housings.

As an example, a method can include detecting presence of an object in proximity to a surface of a housing of a computing device; and, responsive to the detecting, energizing at least one electromagnet to attach the object to the surface. In such an example, the detecting can detect a magnetic field of the object and/or can detect metal of the object.

As an example, a method can include detecting an angle of a surface and controlling energizing of at least one electromagnet based at least in part on the angle.

As an example, a surface can include fibers where a method includes energizing at least one electromagnet to increase force applied by an object to at least a portion of the fibers. In such an example, the fibers may be shear resistance fibers that can be utilized to impart anti-sliding properties (e.g., increase friction coefficient).

As an example, a computing device can include two housings operatively coupled via a hinge assembly where a method can include actuating a sensor responsive to detecting a parallel configuration of the two housing where the sensor provides for the detecting presence of an object in proximity to the surface. In such an example, the sensor can be at least one of a hinge assembly sensor, a Hall effect sensor and a light sensor. For example, consider one or more types of sensors that can detect that a notebook computing device (e.g., notebook or clamshell computing device) is closed.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
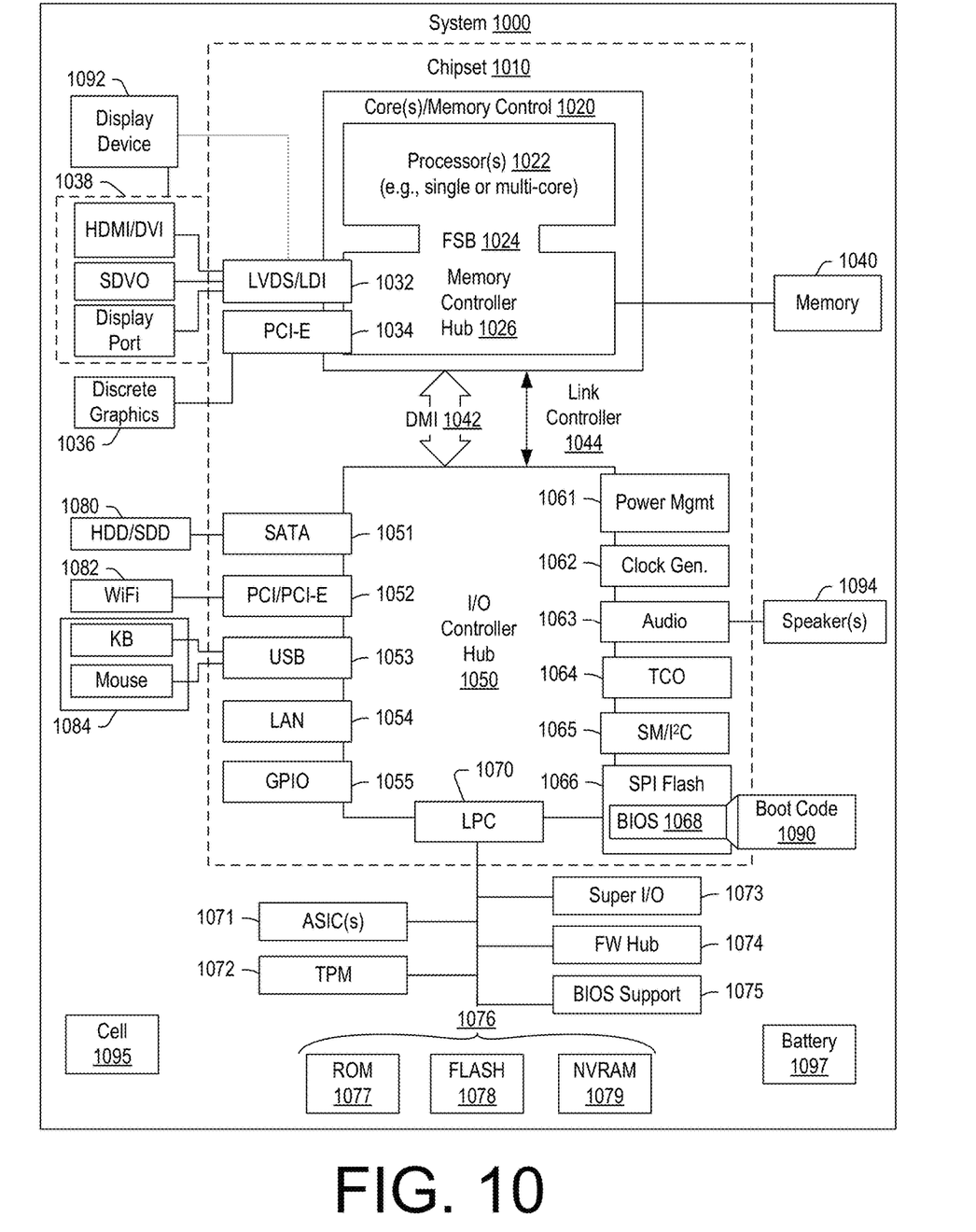
FIG. 10 is a block diagram of an example of a system that includes one or more processors and memory.

While various examples of circuits or circuitry have been discussed, FIG. 10 depicts a block diagram of an illustrative computer system 1000. The system 1000 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 1000. As an example, the computing device 100, the computing device 800, the computing device 900, etc., may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
   a processor;
   memory accessible by the processor;
   a housing that comprises a surface; and
   a deployable attachment mechanism for releasable attachment of an object to the surface, wherein the deployable attachment mechanism comprises a multilayer component that comprises a magnetic layer and a fiber layer, and wherein the fiber layer comprises one or more of a contact fastener layer and a shear resistance layer.

2. The computing device of claim 1, wherein the attachment mechanism comprises an electromagnet.

3. The computing device of claim 1, wherein fibers of the fiber layer comprise contact fastener fibers that comprise hooks and loops.

4. The computing device of claim 1, wherein fibers of the fiber layer comprise polymeric shear resistance fibers that increase a coefficient of friction of the surface.

5. The computing device 1, comprising a Hall effect sensor operatively coupled to the deployable attachment mechanism.

6. The computing device of claim 5, wherein a signal generated by the Hall effect sensor controls delivery of energy to an electromagnet of the deployable attachment mechanism.

7. The computing device of claim 6, wherein the delivery of energy to the electromagnet comprises a current flow direction that depends on the signal.

8. The computing device of claim 1, comprising a metal detector operatively coupled to the deployable attachment mechanism.

9. The computing device of claim 8, wherein a signal generated by the metal detector controls delivery of energy to an electromagnet of the deployable attachment mechanism.

10. The computing device of claim 9, wherein the metal detector comprises the electromagnet.

11. The computing device of claim 1, wherein the deployable attachment mechanism comprises an array of electromagnets.

12. The computing device of claim 11, comprising a sensor array operatively coupled to the array of electromagnets.

13. The computing device of claim 1, comprising a gravitational direction sensor operatively coupled to the deployable attachment mechanism, wherein a signal generated by the gravitational direction sensor controls energy supplied to at least one electromagnet of the deployable attachment mechanism.

14. The computing device of claim 1, wherein the housing comprises a bay and wherein the deployable attachment mechanism is storable in the bay.

15. A method comprising:
    actuating a sensor responsive to detecting a parallel configuration of two housings of a computing device operatively coupled via a hinge assembly, wherein the sensor provides for detecting presence of an object in proximity to a surface of one of the two housings;
    detecting presence of the object in proximity to the surface; and
    responsive to the detecting, energizing at least one electromagnet to attach the object to the surface.

* * * * *